US008775383B2

(12) United States Patent
Shimada

(10) Patent No.: US 8,775,383 B2
(45) Date of Patent: Jul. 8, 2014

(54) FILE EDITING APPARATUS AND FILE EDITING METHOD

(75) Inventor: Hirotoshi Shimada, Tokyo (JP)

(73) Assignee: TEAC Corporation, Tokyo (JP)

(*) Notice: Subject to any disclaimer, the term of this patent is extended or adjusted under 35 U.S.C. 154(b) by 0 days.

(21) Appl. No.: 13/615,093

(22) Filed: Sep. 13, 2012

(65) Prior Publication Data

US 2013/0179406 A1 Jul. 11, 2013

(30) Foreign Application Priority Data

Jan. 6, 2012 (JP) .................................. 2012-001491

(51) Int. Cl.
*G06F 7/00* (2006.01)
(52) U.S. Cl.
USPC ........................................................ 707/662
(58) Field of Classification Search
USPC ........................................................ 707/662
See application file for complete search history.

(56) References Cited

U.S. PATENT DOCUMENTS

2011/0166679 A1* 7/2011 Foust et al. ...................... 700/94

FOREIGN PATENT DOCUMENTS

JP         10293989 A    11/1998
JP      2003323267 A    11/2003

* cited by examiner

*Primary Examiner* — Truong Vo
(74) *Attorney, Agent, or Firm* — Seed IP Law Group PLLC

(57) ABSTRACT

A file editing apparatus for revoking (Undo) destructive segmentation. An audio file is segmented into two files by destructive segmentation. When revoking (Undo) operation is performed after segmentation, an end portion of a preceding file is deleted, and a head of a subsequent file is deleted. A copy file, which has been generated by copying during segmentation and preserved, is inserted between the two files to thereby concatenate the preceding file with the subsequent file, whereby an original file is generated.

4 Claims, 4 Drawing Sheets

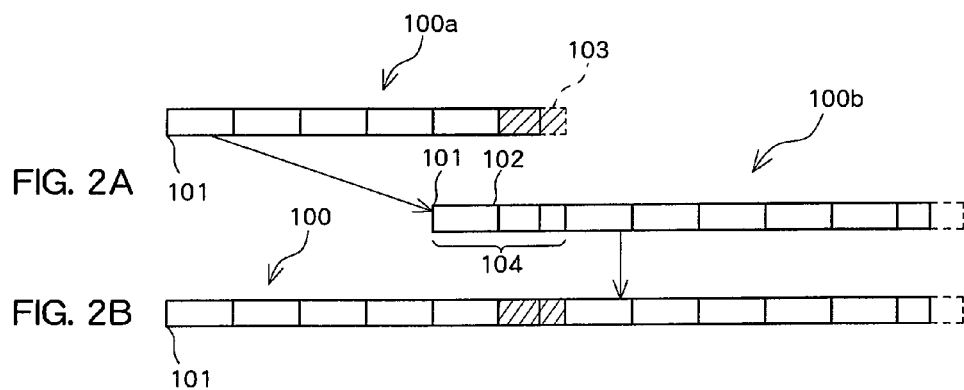
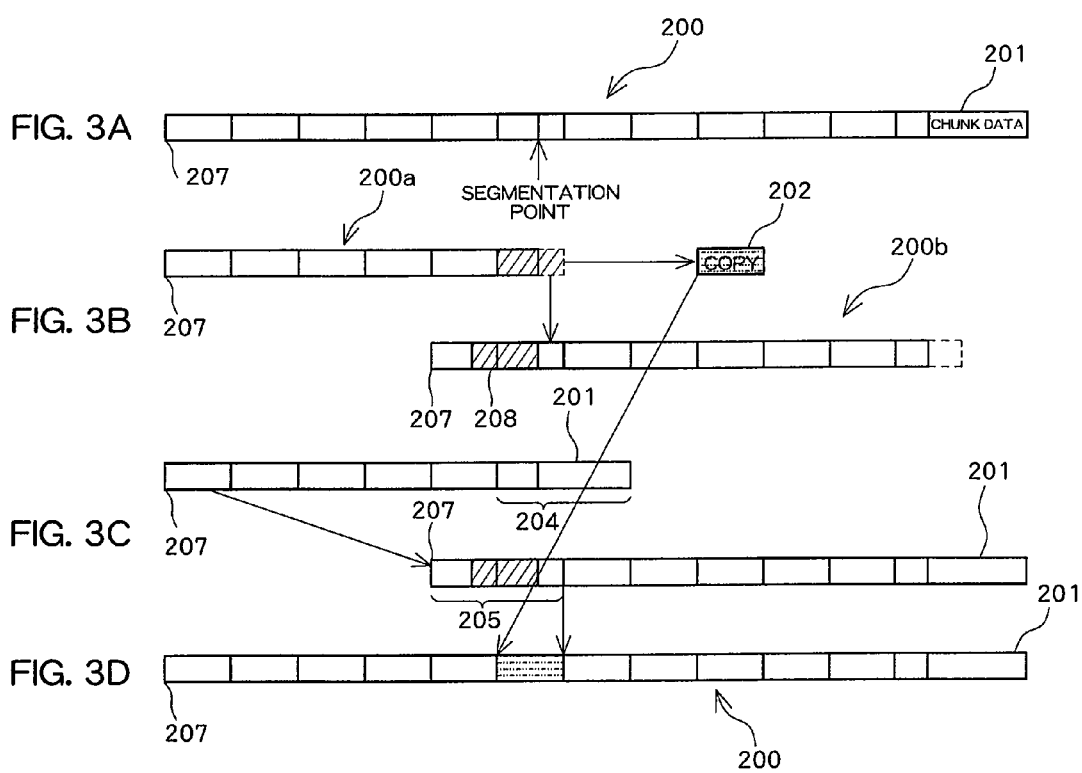

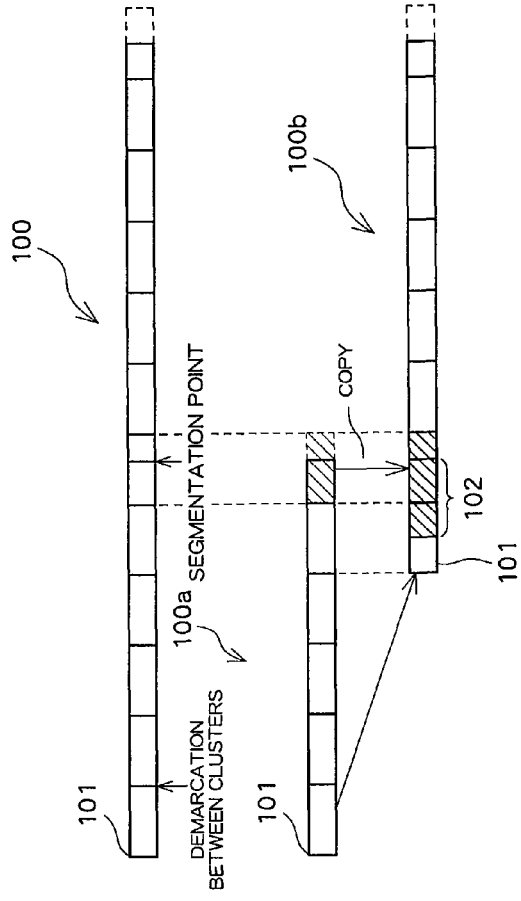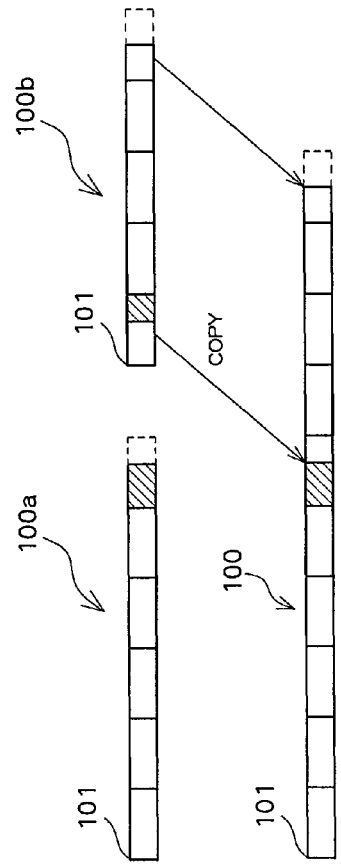
RELATED ART
FIG. 5A
RELATED ART
FIG. 5B
RELATED ART
FIG. 6A
RELATED ART
FIG. 6B

FILE EDITING APPARATUS AND FILE EDITING METHOD

PRIORITY INFORMATION

This application claims priority to Japanese Patent Application No. 2012-001491, filed on Jan. 6, 2012, which is incorporated herein by reference in its entirety.

BACKGROUND OF THE INVENTION

1. Technical Field

The invention relates to an apparatus and a file editing method and, more particularly, a technique for segmenting a file, like an audio data file.

2. Related Art

In connection with various types of recording-reproducing apparatus, techniques for effecting edition, such as changing of alignment sequence of files recorded in a recording medium and segmentation, concatenation, appending, and deletion, and the like, of the files have hitherto been known. Undo techniques for revoking editing operations have been known with this.

Among various types of edition, file segmentation operation is processing for segmenting one file recorded in a recording medium into two sub-files or more and recording the thus-segmented files again in the recording medium. For instance, a certain audio file A recorded in a certain track is assumed to be segmented into two files, or file A1 and file A2, at an arbitrary point desired by a user.

A method for editing files generally includes destructive edition and non-destructive edition. Non-destructive edition is apparent edition achieved by separately retaining edited information while keeping an original file intact. On the contrary, destructive edition is achieved by taking the original file itself as objectives of edition. Accordingly, non-destructive edition is comparatively easy in connection with Undo processing for revoking editing operation. In the case of destructive edition, since the original file itself is edited, Undo processing becomes complicate and entails consumption of much time.

FIGS. 5A and 5B schematically show destructive edition of file segmentation. FIG. 5A shows a file to be segmented; for instance, an audio file 100 composed of audio data. Segmentation of an audio file needs segmenting data at an arbitrary position. In the meantime, when audio data are managed by use of a file system, like an FAT (File Allocation Table), data are read and written on a per-cluster basis. In the drawings, a demarcation line between clusters that is a basic unit for reading and writing data is designated by a separator line. Since data read/write operation is carried out on a per-cluster basis, segmentation is also, naturally performed on a per-cluster basis. Accordingly, performing segmentation in a unit which is smaller than a cluster requires processing for copying data and aligning the thus-copied data to a demarcation between clusters.

Specifically, when a segmentation point is set at a position that is not on the demarcation between clusters as illustrated in FIG. 5A, data belonging to one cluster that includes the segmentation point are copied. Subsequently as shown in FIG. 5B, the audio file 100 to be segmented is segmented into a first half audio file 100a and a last half audio file 100b along the demarcation between clusters including the segmentation point. On this occasion, copied data pertaining to one cluster are appended to the last half audio file 100b. In addition, a file header that is a copy of a file header 101 of the original audio file 100 is appended to a head of the last half audio file 100b.

Since the file header 101 appended to the head can also be written only on a per-cluster basis as in the case with audio data, one cluster including the file header 101 is appended to the head of the last half audio file 100b. No data exist in, except an area of the file header 101, a data field that is an equivalent of one cluster including the file header 101. Therefore, the area of the data field unoccupied by data is filled with dummy data. Accordingly, the last half audio file 100b is configured in such a way that the file header 101 is followed by the dummy data 102 and that the dummy data 102 are also followed by the data that are originally subsequent to the segmentation point.

FIGS. 6A and 6B show (Undo) processing for revoking an audio file that have undergone destructive segmentation under the method shown in FIGS. 5A and 5B. FIG. 6A shows the two audio files 100a and 100b that have been destructively segmented. In operation for revoking segmentation; namely, concatenating operation, the file header 101 appended to the head of the last half audio file 100b is deleted, and the last half audio file 100b is concatenated with a tail end of the first half audio file 100a. However, as mentioned above, reading and writing of data can be performed only on a per-cluster basis. Consequently, when a total size of data pertaining to a final cluster of the first half audio file 100a and data belonging to a starting cluster of the last half audio file 100b exclusive of the file header 101 are not congruous with the size of a cluster unit, the entirety of the last half audio file except the file header 101 must be copied such that the total size becomes congruous with the size of the cluster unit. In FIG. 6A, when a total size of hatched data belonging to the first half audio file 100a and hatched data belonging to the last half audio file 100b except the file header 101 is not congruous with the size of the cluster unit, the entirety of the data belonging to the last half audio file 100b is copied and concatenated with the tail end of the first half audio file 100a as shown in FIG. 6B.

JP 2003-323267 A discloses (Undo) operation for revoking not destructive edition but non-destructive edition. Specifically, according to descriptions of JP 2003-323267 A, in addition to retaining first management data including management information corresponding to details of finally-performed edition, a PC retains second management data including management information achieved immediately before being updated to the management information. Thus, the PC executes Undo operation without retaining a state achieved before edition. JP 10-293989 A discloses first memory means for storing ancillary data read from a mini disk and second memory means for storing data pertaining to a pointer area that is changed in association with execution of edition processing, such as deletion, movement, segmentation, and concatenation of recorded data in the ancillary data stored in the first memory means. It also discloses that there is performed control operation for rewriting the ancillary data stored in the first memory means on the basis of data pertaining to the pointer area stored in the second memory means at the time of revocation or re-execution of edition processing.

As above, since the (Undo) operation for revoking destructive segmentation entails edition of the original file itself, revoke processing becomes complicate. Specifically, when the size of a concatenated area between the first half file and the last half file that have been obtained by segmenting a file is not congruous with the size of a cluster unit that is the unit for reading and writing data, there arises a necessity for copying the entirety of the data pertaining to the last half file, which entails complicate operation and consumption of much time. In particular, when a volume of data pertaining to the last half file is large, a volume of data to be copied also increases accordingly, which raises a problem of much time being consumed by revoke processing.

Moreover, additional information, like chunk data, may be appended to the end of the file depending on a file format. In this case, since the additional information is already formed at the end of the first half file after segmentation, revoke processing becomes more complicate.

SUMMARY

The invention is to provide an apparatus and a method for enabling efficient performance of (Undo) operation for revoking destructive segmentation within a short period of time.

The present invention is directed toward a file editing apparatus that performs revoke processing for revoking segmentation of a file in a system that reads and writes data on a per-minimum-unit basis, the apparatus characterized by comprising:

memory means for copying and storing data pertaining to one minimum unit including a segmentation point during segmentation of the file; and processing means that, when revoking operation is performed, deletes all of minimum units subsequent to a minimum unit of a preceding portion of the segmented file including a segmentation point, deletes a minimum unit of a head of a subsequent portion of the segmented file and one subsequent minimum unit, concatenates data pertaining to the minimum unit stored in the memory means with an end of the deleted preceding portion of the file, and concatenates the deleted subsequent portion of the file with an end of the concatenated data, thereby generating the file that had not yet been segmented.

In one embodiment of the present invention, the processing means is characterized by assigning, in a file allocation table, an unassigned code to numbers of all minimum units subsequent to the minimum unit of the preceding portion of the segmented file including a segmentation point, to thus delete all of the minimum units; assigning the unassigned code to a number of a minimum unit at a head of the subsequent portion of the segmented file and a number of one subsequent minimum unit, thereby deleting the minimum units; and assigning a number of the minimum unit stored in the memory means as a number of a minimum unit subsequent to a number of a minimum unit at an end of the preceding portion of the file and assigns a number of a minimum unit at a head of the subsequent potion of the file as a number of a minimum unit subsequent to the number of the minimum unit stored in the memory means, thereby generating the file that had not yet been segmented.

The present invention is also directed toward a file editing method of performing revoke processing for revoking segmentation of a file in a system that reads and writes data on a per-minimum-unit basis, the method comprising a step of copying and storing data pertaining to one minimum unit including a segmentation point during segmentation of the file; and a step of, when revoking operation is performed, deleting all of minimum units subsequent to a minimum unit of a preceding portion of the segmented file including a segmentation point, deleting a minimum unit at a head of a subsequent portion of the segmented file and one subsequent minimum unit, concatenating data pertaining to the minimum unit stored in memory means with an end of the deleted preceding portion of the file, and concatenating the deleted subsequent portion of the file with an end of the data, thereby generating the file that had not yet been segmented.

The present invention enables efficient performance of operation (Undo) for revoking destructive segmentation within a short period of time. Specifically, the invention does not need copying an entirety of a subsequent portion of the segmented file, and the essential requirement of the invention is to solely copy data pertaining to one minimum unit including a segmentation point during segmentation. Thus, processing can be speeded up.

The invention will be more clearly comprehended by reference to embodiments provided below. However, the following embodiments are illustrative, and the invention is not limited to the embodiments.

BRIEF DESCRIPTION OF THE DRAWINGS

Preferred embodiments of the invention will be described in detail by reference to the following drawings, wherein:

FIGS. 2A and 2B are schematic diagrams showing revoke processing of the embodiment;

FIGS. 3A to 3D are schematic diagrams showing revoke processing of another embodiment;

FIGS. 5A and 5B are schematic diagrams of segmentation processing of the related art; and FIGS. 6A and 6B are schematic diagrams of revoke processing of the related art.

DETAILED DESCRIPTION

Figure 1:
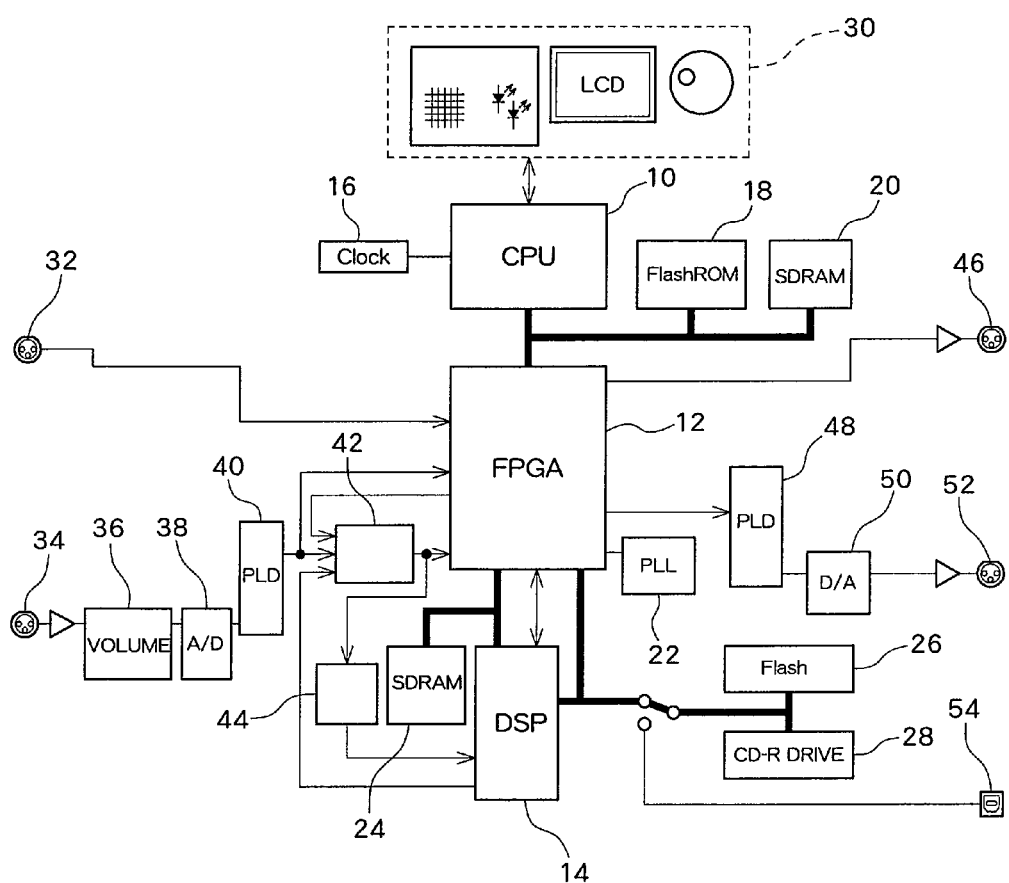
FIG. 1 is a block diagram of a digital recorder of an embodiment.

Embodiments of the invention are hereunder described by reference to the accompanying drawings by taking, as an example, a digital recorder that records audio data in a recording medium. The digital recorder is merely illustrative, and the invention can also be applied to anther digital device. FIG. 1 shows a configuration of the digital recorder of the embodiment. The digital recorder has external input terminals, or an analogue input terminal and a digital input terminal, and records an audio signal fed by way of any of the external input terminals to a write once optical disk, like a CD-R/RW disk and a DVD-R/RW disk. The digital recorder also has a memory connection terminal, such as a memory slot, and can record audio data in flash memory, such as a CF card and an SD card. Audio data read from the flash memory can also be recorded in the optical disk. The digital recorder has a CPU 10, an FPGA (Field Programmable Gate Array: a programmable LSI) 12, a DSP 14, flash memory 26, and a CD-R drive 28. The CD-R drive 28 can also be a CD/DVD-R drive or a drive capable of recording data in an optical disk rewritable, like CD-RW disk and a DVD-RW disk.

The CPU 10 operates on a clock signal from a clock 16 and performs various types of processing pursuant to a command from a user interface block 30. A processing program of the CPU 10 is stored in flash ROM 18, and data processed by the CPU are stored in SDRAM 20 serving as work memory. The user interface block 30 has a display LED, an LCD, and a rotary encoder used for enabling visual recognition of a variety of keys and operating conditions. The rotary encoder is used for controlling a sound volume, menu selection, and the like. The user interface block 30 is provided on a front panel of the digital recorder.

A digital input terminal 32 feeds a digital audio signal to the FPGA 12, and an analogue audio signal is fed from an analogue input terminal 34 by way of a volume 36, an A/D converter 38, and a PLD (Programmable Logic Device) 40.

The FPGA 12 operates on a clock signal from a PLL 22 and serially exchanges audio data with the DSP 14, thereupon outputting a processing result to a digital output terminal 46 or an analogue output terminal 52 by way of a PLD 48 and a D/A converter 50.

The DSP 14 performs processing for converting a data format of an audio file, like converting audio data into PCM audio data. In addition, the DSP 14 subjects an audio signal to various types of effect processing and feeds a processing result to the FPGA 12. A fader 42 and a D filter 44 are also used for various types of processing. The D filter 44 is used in generating meter display data or converting audio data into PCM audio data. Moreover, the DSP 14 performs various types of edition processing including destructive segmentation and processing for revoking the processing operations. SDRAM 24 is work memory for temporarily storing data processed by the DSP 14 and/or a signal from the FPGA 12.

A USB terminal 54 is provided on a rear panel of the digital recorder and connected to a personal computer.

In the foregoing configuration, when a user selects recording of specific audio data; for instance, MP3 audio data, into a CD-R disk by use of a function key of the user interface block 30 or a rotary encoder, the CPU 10, the FPGA 12, and the DSP 14 feeds the thus-input MP3 data to the drive 28, such as a CD-R drive, thereupon writing the MP3 data into a CD-R disk, or the like. When there is a command for segmentation of the audio file recorded in the CD-R disk or the like, predetermined processing is carried out to segment a file and record the thus-segmented files into a CD-R disk, or the like. When the user has performed operation for revoking segmentation, the DSP 14 executes predetermined processing in response to the operation, thereby again concatenating the files with each other and recording the thus-concatenated files on the CD-R disk.

Segmentation processing and revoke (Undo) processing of the embodiment are first described in connection with a case where there are no chunk data. Subsequently, explanations are given to a case where there are chunk data.

FIGS. 2A and 2B show revoke processing performed when there are no chunk data. FIG. 2A shows a first half audio file 100a and a last half audio file 100b obtained after destructive segmentation. The files each have the same file configurations as those shown in FIG. 5B.

Basically, as mentioned above, when the total size of the data pertaining to the final cluster of the first half audio file 100a and the data pertaining to the starting cluster of the last half audio file 100b except a file header 101 is not congruous with the size of the cluster unit, the entirety of the last half audio file except the file header 101 must be copied so as to make a match between the cluster sizes. However, when attention is paid to the final cluster of the first half audio file 100a, a portion 103 subsequent to the segmentation point is followed by the same data as that following the segmentation point of the last half audio file 100b. The reason for this is that the final cluster of the first half audio file 100a is copied and concatenated with the last half audio file 100b during segmentation operation. Accordingly, the starting cluster of the last half audio file 100b including the file header 101 and a subsequent cluster (the cluster generated by copying the final cluster of the first half audio file 100a during segmentation) are deleted, and the last half audio file 100b yielded after deletion is concatenated with the tail end of the first half audio file 100a. An original audio file 100 achieved before segmentation can be restored by means of only table management of an FAT without copying the last half audio file 100b. Specifically, the starting cluster of the last half audio file 100b forms a cluster unit from the file header 101 and dummy data 102 at the time of segmentation. Data pertaining to a subsequent cluster overlap the data pertaining to the first half audio file 100a. Therefore, revoke processing without involvement of copying operation, such as that mentioned above, is feasible. In the FAT, the number of the starting cluster of the last half audio file 100b and the number of a cluster subsequent to the starting cluster are rewritten into numbers of unassigned clusters; namely, numbers of clusters subsequent to the number of the final cluster of the first half audio file 100a. The starting cluster of the last half audio file 100b acquired after deletion of a portion 104 is assigned the thus-rewritten number, to thus concatenate the first half audio file 100a with the last half audio file 100b. Since processing for copying the last half audio file 100b is not performed, revoke processing can be performed fast.

Explanations are now given to a case where chunk data are appended to the end of the audio file. Depending on a file format (e.g., a BWF format), additional information called chunk data are sometimes formed at the end of the audio file. In this case, since chunk data are also formed in the first half audio file yielded after segmentation, revoke processing, such as that mentioned above, cannot be used. The reason for this is as follows: Revoke processing utilizes an overlap between the final portion 103 of the first half audio file 100a and the data pertaining to the starting cluster of the last half audio file 100b in FIG. 2A. However, if chunk data are formed at the end of the first half audio file 100a, the overlap will disappear or will be corrupted. Accordingly, in the embodiment, revoke processing is executed as follows:

FIGS. 3A to 3D show segmentation and revoke processing performed when chunk data are formed at the end of the audio file. FIG. 3A shows an original audio file 200. Chunk data 201 are formed as additional information at the end of the audio file 200.

FIG. 3B shows segmentation. As in the case with segmentation shown in FIG. 5A, when the audio file 200 is segmented at an arbitrary segmentation point, data pertaining to one cluster including a segmentation point are copied and preserved as a copy file 202 at an arbitrary position in the recording medium. As in the case with segmentation shown in FIG. 5B, the thus-copied file 202 is concatenated with the head of the last half audio file. In addition, one cluster including a file header 207, which is a copy of a file header of the original audio file 200, and dummy data 208 is concatenated with the head of the copied file 202, to thus generate a last half audio file 200b (a hatched portion of the last half audio file 200b is dummy data). The chunk data 201 are formed at both ends of a first half audio file 200a and the last half audio file 200b. As shown in FIG. 3C, the original audio file is segmented into the first half audio file 200a with the chunk data 201 and the last half audio file 200b with the chunk data 201. After segmentation of the audio data 200, the user can edit only the last half audio data 200b or perform data processing, such as replacement of the data with another file.

In the meantime, when the user has performed operation for revoking segmentation, a CPU 10 deletes the entirety of a cluster 204 subsequent to the cluster of the first half audio file 200a including the segmentation point. The chunk data included in the first half audio file 200a are thereby eliminated. Further, the starting cluster including the file header 207 and a subsequent cluster 205 are deleted from the last half audio file 200b. The copy file 202 that has been previously copied and preserved during segmentation are concatenated with the end of the first half audio file 200a from which the portion 204 has been deleted, and the head of the last half audio file 200b from which the clusters have been deleted is concatenated with the end of the copy file 202. Finally, the chunk data are reconstructed and placed at the end of the thus-concatenated audio file, whereby the original audio file 200 achieved before segmentation is restored.

Figure 4:
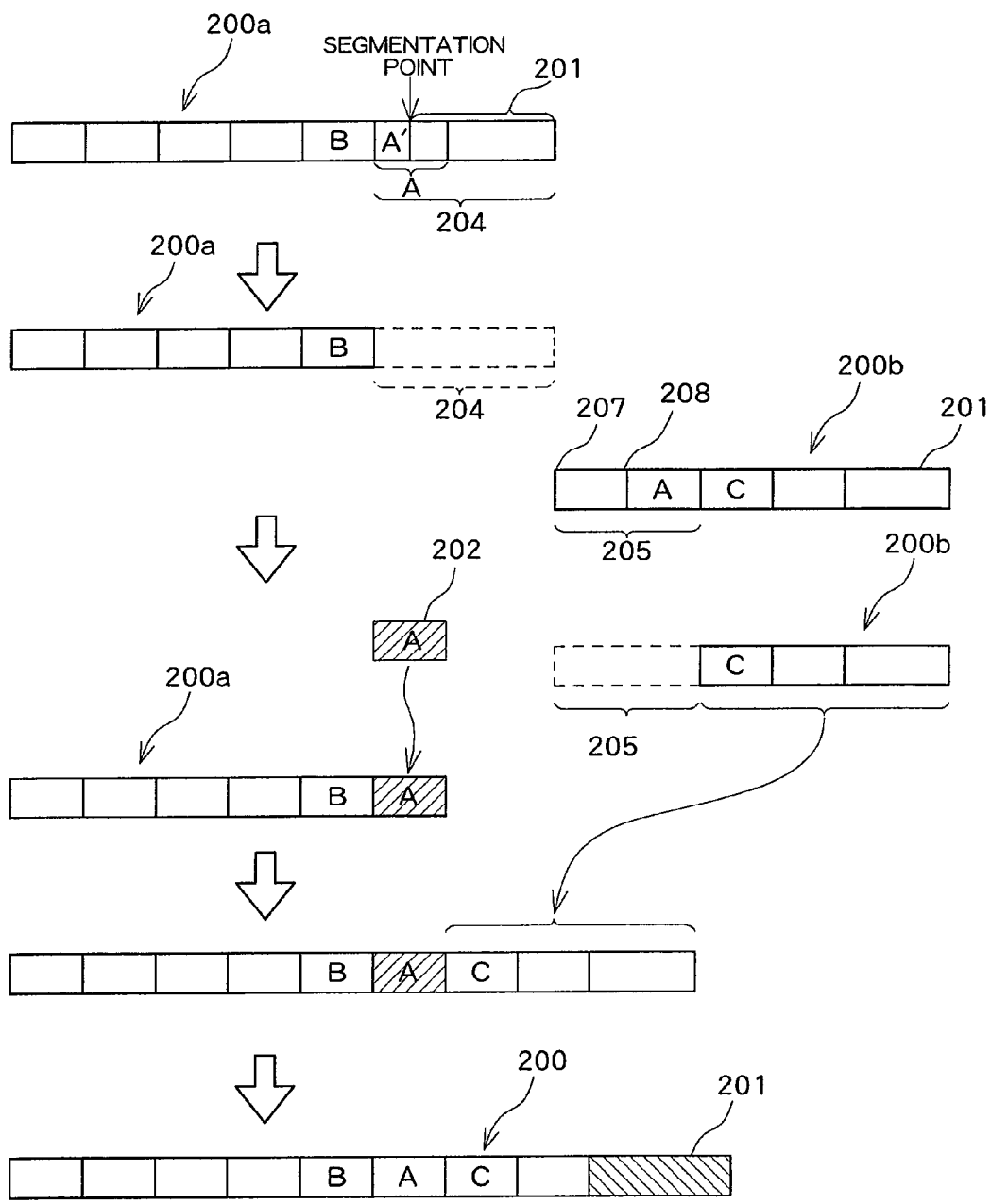
FIG. 4 is a schematic diagram showing revoke processing of still another embodiment.

Revoking operation of the embodiment is now described in more detail by reference to FIG. 4.

The portion 204 that is a sum of the cluster including the segmentation point and the cluster of the chunk data 201 is extracted from the first half audio file 200a yielded after segmentation, and the thus-extracted portion 204 is deleted. A word "deletion" used herein means eliminating the cluster including the segmentation point and the cluster of the chunk data 201 from a chain of clusters making up the audio file 200a in the FAT that manages the audio file 200a. Specifically, a code (0000h, or the like) showing an unassigned cluster is assigned to the numbers of these clusters. In the drawing, the deleted portion 204; namely, the portion 204 rewritten into an unassigned cluster, is designated by a broken line. The first half audio file 200a is thereby recognized as a file that is free of the portion 204, in at least the FAT.

In the meantime, the portion 205 that is a sum of the starting cluster including the file header 207 and a subsequent cluster is extracted from the last half audio file 200b, and the thus-extracted portion 205 is deleted. As in the case with the portion 204, the word "deletion" used herein also means deleting both the starting cluster and a subsequent cluster from the chain of clusters making up the audio file 200b, in the FAT that manages the audio file 200b. Specifically, a code showing an unassigned cluster is assigned to the numbers of the clusters. In the drawing, the thus-deleted portion 205 is also designated by a broken line. The last half audio file 200b is thereby recognized as a file that is free of the portion 205 in at least the FAT.

The copy file 202 that has been previously copied and preserved during segmentation is concatenated with the final cluster of the first half audio file 200a from which the portion 204 has been deleted. Specifically, the number of the cluster of the copy file 202 is assigned as a number of a cluster subsequent to the number of the final cluster of the first half audio file 200a in the FAT.

Next, the last half audio file 200b from which the portion 205 has been deleted is concatenated with the end of the first half audio file 200a concatenated with the copy file 202; namely, the end of the copy file 202. Specifically, the number of the starting cluster of the last half audio file 200b from which the portion 205 has been deleted is assigned as a number of a cluster subsequent to the cluster number of the copy file 202 in the FAT.

As above, when the first half audio file 200a and the last half 200b are concatenated with each other by way of the copy file 202, the chunk data 201 of the concatenated audio file 200 are reconstructed and appended to the end of the concatenated file.

In the original audio data 200, data A are assumed to be stored in the cluster including the segmentation point; data B are assumed to be stored in a cluster preceding the cluster of the data A; and data C are assumed to be stored in a cluster subsequent to the cluster of the data A. The end of the first half audio file 200a yielded after segmentation are followed by the data B, data A' (a data portion preceding the segmentation point in the data A), and the chunk data 201. As a result of deletion of the portion 204, the data B comes to the end of the first half audio file 200a yielded after deletion. The file header 207, the dummy data 208, the data A, and the data C are, in this sequence, at the end of the last half audio file 200b yielded after segmentation. Since the portion 205 is deleted, the data C come to the head of the last half audio data yielded after deletion. If the first half audio file 200a and the last half audio file 200b are concatenated with each other, just as they are, the data B will be followed by the data C, and the data A will be dropped. Accordingly, the copied, preserved data A are inserted between the data B and the data C, whereby the original, correct data array B-A-C is acquired. One of the characteristics of the embodiment lies in that data pertaining to one cluster including a segmentation point are previously copied and preserved during segmentation in consideration of revoke processing which will be performed later.

As mentioned above, processing shown in FIG. 4 involves data copy; namely, a copy of data pertaining only to one cluster including a segmentation point. Hence, revoke processing can be performed fast. In particular, a copy of data pertaining only to one cluster is performed without regard to the volume of data pertaining to the last half audio file 200b; hence, a resultant advantage can be said to be considerably great.

Although destructive segmentation and operation for revoking destructive segmentation have been described in the embodiment while the audio file has been taken by way of example, the invention is not limited to the embodiment and can also be applied to an arbitrary file including video data. Moreover, the explanations have been provided in the embodiment while the cluster that is the minimum unit capable of reading (READ)/writing (WRITE) in which there is recorded a file system, such as an FAT, is taken by way of example. However, the invention is not limited to the example. The invention can also be applied to any minimum unit, so long as the minimum unit capable of reading (READ)/writing (WRITE) data in which a system is recorded. If the minimum unit is a block, the block will naturally be included in the invention.

Further, the explanations have been provided to the case where original audio data are segmented into two sets of data, as example segmentation. However, the invention can also be applied, in the same manner, to a case where audio data are segmented into three or more sets of data. For instance, when audio data are segmented into three sets of data, the thus-segmented three audio files are assumed to be, in sequence from the beginning, a first audio file, a second audio file, and a third audio file. First, the first audio file is considered to be a first half audio file, and the second audio file is considered to be a last half audio file. The first half audio file and the last half audio file are concatenated with each other, to thus produce a new first half audio file. The third audio file is considered to be a new last half audio file, and they are concatenated with each other, to thus enable restoration of the original audio file.

The words "first half" and "last half" employed in the embodiment do not always mean a first half and a last half resulting from bisection of an audio file but mean a preceding portion and a subsequent portion acquired after bisection. As a matter of course, a preceding portion of a segmented file can also be referred to as a first portion, and a subsequent portion of the same can also be referred to as a second portion.

Moreover, in the embodiment, the explanations have been provided to processing performed when a segmentation point is arbitrary and when a point in the original file except a demarcation between clusters is set as a segmentation point. However, if the segmentation point matches a demarcation between clusters, processing for copying and preserving data pertaining to one cluster including a segmentation point will become obviated. Accordingly, in the embodiment, it is also preferable to perform processing for determining whether or not a segmentation point corresponds to a demarcation between clusters, before performance of processing pertaining to FIGS. 3A to 3D and FIG. 4 and previously copying and preserving data pertaining to one cluster including a segmentation point when the segmentation point does not match the demarcation between clusters.

What is claimed is:

1. A file editing apparatus that performs revoke processing for revoking segmentation of a file in a system that reads and writes data on a per-minimum-unit basis, the apparatus comprising:
   a memory configured to store the file and first and second segments of the file created during segmentation of the file;
   a processor configured to:
      segment the file, at a segmentation point of the file, into the first and second segments;
      copy to the memory a minimum unit including the segmentation point; and
      in response to receiving a revocation command from a user, revoke the segmentation operation by:
         deleting a minimum unit of the first segment including the segmentation point and any minimum unit(s) of the first segment subsequent to the minimum unit of the first segment including the segmentation point;
         deleting a first and a second minimum unit from a front end of the second segment;
         concatenating the copied minimum unit including the segmentation point to a back end of the first segment; and
         concatenating the second segment to a back end of the copied minimum unit including the segmentation point, thereby reproducing the file prior to segmentation.

2. The file editing apparatus according to claim 1, wherein the processor is configured to:
   delete minimum units of the first and second segments during the revocation operation by assigning, in a file allocation table, an unassigned code to numbers of all minimum units to be deleted;
   concatenate the copied minimum unit with the first segment by assigning to the copied minimum unit a number of a minimum unit subsequent to a number of a final minimum unit of the first segment; and
   concatenate the second segment with the copied minimum unit by assigning to a front most minimum unit of second segment a number of a minimum unit subsequent to the number of the copied minimum unit, thereby reproducing the file prior to segmentation.

3. The file editing apparatus according to claim 1, wherein the minimum unit is a cluster.

4. The file editing apparatus according to claim 2, wherein the minimum unit is a cluster.

* * * * *